(No Model.)
S. W. JOHNSON.
NUT LOCK.
No. 596,517.  Patented Jan. 4, 1898.
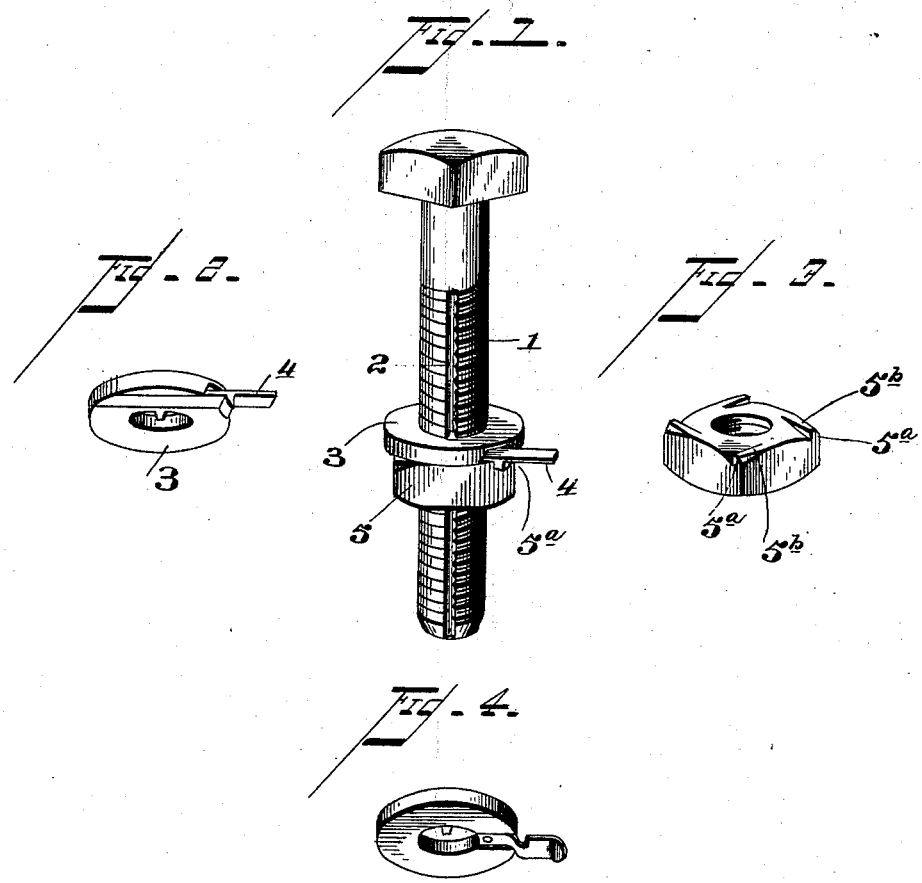
WITNESSES
INVENTOR
Samuel W. Johnson
By John Hedderburn
Attorney

United States Patent Office.

SAMUEL W. JOHNSON, OF DUNCANNON, PENNSYLVANIA.

NUT-LOCK.

SPECIFICATION forming part of Letters Patent No. 596,517, dated January 4, 1898.

Application filed March 19, 1897. Serial No. 628,257. (No model.)

*To all whom it may concern:*

Be it known that I, SAMUEL W. JOHNSON, a citizen of the United States, residing at Duncannon, in the county of Perry and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to certain improvements in nut-locks, the object being to provide a simple and inexpensive lock which will effectually prevent the rotation of the nut and which is applicable to the ordinary nuts now in use.

To this end my invention comprises certain novel features of construction, whereby it is made simpler and better adapted for the purposes for which it is intended, as will be hereinafter fully described, and specifically defined in the appended claim.

In the accompanying drawings, Figure 1 represents a perspective view of a bolt and nut having my improved lock applied thereto. Fig. 2 is a similar view of the lock removed. Fig. 3 is a similar view of the nut removed, and Fig. 4 is a modified form of the invention.

Similar reference-numerals indicate corresponding parts in all the figures of the drawings.

1 represents a screw-bolt of any ordinary or desired construction, shown in this instance, however, as provided with a longitudinal groove 2, which extends practically the whole length of the threaded shank, and this groove is intended to receive within it the tooth of a washer 3. The outer face of the washer 3 is provided with a spring-catch 4, the outer free end of which projects beyond the periphery of the washer, and its intermediate portion is provided with a tooth adapted to engage depressions arranged upon the inner face of the nut 5. These depressions are made in the form of teeth $5^a$ and which I have shown as four in number, one in each corner, and tapering from the face of the nut inwardly to form a shoulder or projection $5^b$, against which the tooth of the catch 4 will engage. This prevents a backward rotation of the nut, but readily admits of a forward rotation thereof, and the outer sides of the nut, at a point adjacent to the shoulders, are beveled, so as to easily pass under the tooth or projection of the catch referred to.

When the nut has been properly tightened in the usual manner, the engagement of one of the depressions therein with the tooth of the catch will prevent any backward rotation and consequent fastening of the nut by reason of the tooth of the washer 3 engaging with its groove in the shank of the screw above referred to.

As clearly shown in the drawings, the spring-catch in the washer 3 is arranged horizontally above the central opening therein and lies in a direct line with the edge of the nut, so that its tooth will the more securely engage the depressions in the face of the nut; but in Fig. 4 I have shown this catch in the form of a spring arranged radially upon the washer, having its upper end bent so as to project over the edge of the nut and permit its edge to engage with the depressions therein, and thus secure the nut against backward movement.

It will thus be seen that my invention provides in a simple and inexpensive manner a lock which can be readily and quickly applied to the nuts used for various purposes, and by its use all loosening of the nut is absolutely prevented.

Having thus described my invention, what I claim as new, and desire to secure by Letters Patent, is—

In a nut-lock, the combination of a bolt having a longitudinal groove therein, a washer having a tooth to engage said groove and also provided with a spring-arm which extends outwardly through the edge thereof and having a downward projection, and a nut having shouldered projections at the angles thereof adapted to be engaged by the projection on the spring-arm, the said spring-arm extending outward beyond the periphery of the washer, substantially as described.

In testimony whereof I have signed this specification in the presence of two subscribing witnesses.

SAMUEL W. JOHNSON.

Witnesses:
 A. M. MILLER,
 THOS. D. MILLER.